(12) United States Patent
Gaal et al.

(10) Patent No.: US 7,751,367 B2
(45) Date of Patent: Jul. 6, 2010

(54) CONVEYING SECTOR LOAD INFORMATION TO MOBILE STATIONS

(75) Inventors: Peter Gaal, San Diego, CA (US); Sai Yiu Duncan Ho, San Diego, CA (US)

(73) Assignee: QUALCOMM, Inc., San Diego, CA (US)

( * ) Notice: Subject to any disclaimer, the term of this patent is extended or adjusted under 35 U.S.C. 154(b) by 1251 days.

(21) Appl. No.: 11/006,945

(22) Filed: Dec. 7, 2004

(65) Prior Publication Data

US 2005/0201331 A1 Sep. 15, 2005

Related U.S. Application Data

(60) Provisional application No. 60/529,134, filed on Dec. 11, 2003.

(51) Int. Cl.
*H04W 4/00* (2009.01)
*H04W 72/00* (2009.01)
*H04B 17/02* (2006.01)

(52) U.S. Cl. .............. 370/332; 370/341; 455/453; 455/135

(58) Field of Classification Search ............ 370/328, 370/329, 330, 332, 333, 341, 351, 353, 378, 370/468; 455/453, 455, 450, 451, 452.1, 455/452.2, 134, 135
See application file for complete search history.

(56) References Cited

U.S. PATENT DOCUMENTS 5,596,333 A * 1/1997 Bruckert ............... 342/457

| | | | |
|---|---|---|---|
| 5,781,861 A | 7/1998 | Kang et al. | |
| 6,078,817 A | 6/2000 | Rahman | |
| 6,229,795 B1 | 5/2001 | Pankaj et al. | |
| 6,335,922 B1 | 1/2002 | Tiedemann et al. | |
| 6,609,012 B1 * | 8/2003 | Malmgren et al. | 455/562.1 |
| 7,099,384 B1 * | 8/2006 | Jalali et al. | 375/229 |
| 7,406,295 B1 * | 7/2008 | Yarkosky | 455/9 |
| 2003/0129989 A1 | 7/2003 | Gholmieh et al. | |
| 2003/0176192 A1 | 9/2003 | Morimoto et al. | |

FOREIGN PATENT DOCUMENTS

| | | |
|---|---|---|
| EP | 0933955 A1 | 8/1999 |
| EP | 1349410 A2 | 7/2007 |
| JP | 2003-264869 A | 9/2003 |
| KR | 2003-0074256 | 9/2003 |
| KR | 2003-0036913 | 12/2004 |
| WO | 0232156 A2 | 4/2002 |

OTHER PUBLICATIONS

International Search Report—PCT/US04/041578—International Search Authority, European Patent Office—Jun. 24, 2005.
Written Opinion—PCT/US04/041578—International Search Authority, European Patent Office—Jun. 24, 2005.
International Preliminary Report on Patentability—PCT/US04/041578—IPEA, US—Sep. 13, 2006.

* cited by examiner

*Primary Examiner*—Hanh Nguyen
(74) *Attorney, Agent, or Firm*—D. Scott Juneau

(57) ABSTRACT

Improved serving sector selection mechanisms are provided which convey sector load information to a wireless communicator. The wireless communicator can use carrier-to-interference (C/I) ratio measurements and sector load information for each of its Active Set (AS) sectors (or all sectors in its Active Set (AS)) to determine the best serving sector.

76 Claims, 8 Drawing Sheets

| Message Authetication Code (MAC)_ID | WALSH_MASK | Encoder Packet (EP)_SIZE | ACID | SPID | AI_SN | LWCI | EXT_MSG_TYPE | RESERVED |
|---|---|---|---|---|---|---|---|---|
| 8 bits | 0 or 13 bits | 0 or 3 bits | 0 or 2 bits | 0 or 2 bits | 0 or 1 bit | 0 or 5 bits | 0 or 2 bits | 0 or 8 bits |

FIG. 5

| Message Authetication Code (MAC)_ID | PN_OFFSET | PN_LOAD | WALSH _MASK | Encoder Packet (EP)_SIZE | ACID | SPID | AI_SN | LWCI | EXT_MSG _TYPE | RESERVED |
|---|---|---|---|---|---|---|---|---|---|---|
| 8 bits | 0 or ?? bits | 0 or ?? bits | 0 or 13 bits | 0 or 3 bits | 0 or 2 bits | 0 or 2 bits | 0 or 1 bit | 0 or 5 bits | 0 or 2 bits | 0 or 8 bits |

FIG. 6

CONVEYING SECTOR LOAD INFORMATION TO MOBILE STATIONS

CLAIM OF PRIORITY UNDER 35 U.S.C. §119

The present Application for Patent claims priority to Provisional Application No. 60/529,134 entitled "CONVEYING SECTOR LOAD INFORMATION TO MOBILE STATIONS" filed Dec. 11, 2003; assigned to the assignee hereof and hereby expressly incorporated by reference herein.

BACKGROUND

The present invention relates generally to communications, and more specifically to a novel and improved method and apparatus for selecting a serving sector.

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed which enhance the capacity for data services by using higher order modulation, very fast feedback of Carrier-to-Interference ratio (C/I) from the mobile station, very fast scheduling, and scheduling for services which have more relaxed delay requirements. An example of such a data-only communication system using these techniques is the High Data Rate (HDR) system which conforms to the TIA/EIA/IS-856 standard (the IS-856 standard).

In contrast to the other above named standards, an IS-856 system uses the entire spectrum available in each cell to transmit data to a single user at one time, wherein the user is selected based on link quality and other considerations, such as data pending, etc. In so doing, the system spends a greater percentage of time sending data at higher rates when the channel is good, and thereby avoids committing resources to support transmission at inefficient rates. The net effect is higher data capacity, higher peak data rates, and higher average throughput.

Systems may incorporate support for delay-sensitive data, such as voice channels or data channels supported in the IS-2000 standard, along with support for packet data services such as those described in the IS-856 standard. One such system is described in a proposal entitled "Updated Joint Physical Layer Proposal for 1xEV-DV," submitted to 3GPP2 as document number C50-20010611-009, Jun. 11, 2001; "Results of L3NQS Simulation Study," submitted to 3GPP2 as document number C50-20010820-011, Aug. 20, 2001; and "System Simulation Results for the L3NQS Framework Proposal for cdma2000 1xEV-DV," submitted to 3GPP2 as document number C50-20010820-012, Aug. 20, 2001. These, and related documents generated subsequently, such as Revision C of the IS-2000 standard, including C.S0001.C through C.S0006.C, and C.S0001.D through C.S0006.D are hereinafter referred to as the 1xEV-DV.

1xEV-DV

A system such as the one described in the 1xEV-DV standard generally comprises channels of four classes: overhead channels, dynamically varying IS-95 and IS-2000 channels, a Forward Packet Data Channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services.

The F-PDCH may be used for data services which are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate which is supportable depends primarily upon the available power and Walsh codes after the power and Walsh codes for the overhead, IS-95, and IS-2000 channels have been assigned. The data transmitted on the F-PDCH is spread using one or more Walsh codes.

In a 1xEV-DV system, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission which supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel or R-CQICH. The scheduling algorithm is used to determine the mobile station selected for transmission, as well as the appropriate rate and transmission format in accordance with the channel quality. A variety of scheduling algorithms may be implemented, such as the Proportional-Fair algorithm detailed in U.S. Pat. No. 6,229,795.

In such a system, a mobile station receives forward link data from a serving base station. As described, reverse link feedback from a mobile station to the serving station may be used for forward link scheduling and transmission. A mobile station will not receive the Forward Packet Data Channel, or F-PDCH, from more than one base station. However, a mobile station may be in soft handoff on the reverse link with one or more non-serving base stations and/or sectors to provide reverse link switching diversity.

In CDMA2000 systems starting from Revision C, there is a forward link (FL) packet data channel (F-PDCH) and an associated packet data control cannel (F-PDCCH). The mobile station (MS) reports C/I for the current serving BS sector only and selects the best forward link base station (BS) sector providing the F-PDCH and F-PDCCH based on the forward link channel quality for each base station, measured as the FL C/I. The mobile station (MS) switches to which base station according to a switching procedure described in the Medium Access Control (MAC) Standard. One example of these procedures is described in U.S. patent application Ser. No. 10/274,343 entitled "Method and Apparatus for Controlling Communications of Data from Multiple Base Stations to a Mobile Station in a Communication System" filed Oct. 18, 2002; assigned to the assignee hereof and hereby expressly incorporated by reference herein in its entirety.

Notwithstanding these advances, there is a need in the art for improved serving sector selection mechanisms.

SUMMARY

Embodiments disclosed herein address the need for improved serving sector selection mechanisms by providing techniques for conveying sector load information to a wireless communicator. According to one aspect, the MS can use continuous carrier-to-interference (C/I) ratio measurements and sector load information for each of its Active Set (AS) sectors (or all sectors in its Active Set (AS)) to autonomously determine the best serving sector.

In one aspect, a system is provided which includes a plurality of remote stations each comprising a plurality of sectors, and a wireless communicator, served by a current serving sector. Each sector can have a plurality of neighbor sectors. Each remote station includes a processor which determines sector load information, and a transmitter which transmits the sector load information. The wireless communicator includes a channel quality estimator which measures the carrier-to-interference (C/I) ratio for each sector in the wireless communicator's Active Set (AS), a memory which stores the carrier-to-interference (C/I) ratio measurements for the sectors in the wireless communicator's Active Set (AS), and a processor which autonomously determines a new serving sector based on the carrier-to-interference (C/I) ratio measurements and the sector load information for each of the AS sectors. In one embodiment, the current serving sector transmits the sector load information for all neighbor sectors to the wireless communicator. Alternatively, each sector may transmit a load value corresponding to its sector load information.

In another aspect, a remote station is provided which includes a plurality of sectors, a processor, and a transmitter. Each sector can have a plurality of neighbor sectors. The processor determines sector load information, and the transmitter transmits the sector load information. A current serving sector can transmit the sector load information for all neighbor sectors.

In yet another aspect, a wireless communicator is provided which is served by a current serving sector. The wireless communicator includes a receiver, a channel quality estimator, a memory, and a processor. The receiver receives sector load information for each sector in the wireless communicator's Active Set (AS). The channel quality estimator measures the carrier-to-interference (C/I) ratio for each sector in the wireless communicator's Active Set (AS). The memory stores the carrier-to-interference (C/I) ratio measurements for the sectors in the wireless communicator's Active Set (AS). The processor autonomously determines a new serving sector based on the carrier-to-interference (C/I) ratio measurements and sector load information for each of the AS sectors.

Various other aspects are also presented. The invention provides methods and system elements which implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 5 is a standard F-PDCCH control message;

FIG. 6 is a modified F-PDCCH control message according to an aspect of the invention;

DETAILED DESCRIPTION

Definitions

Figure 1:
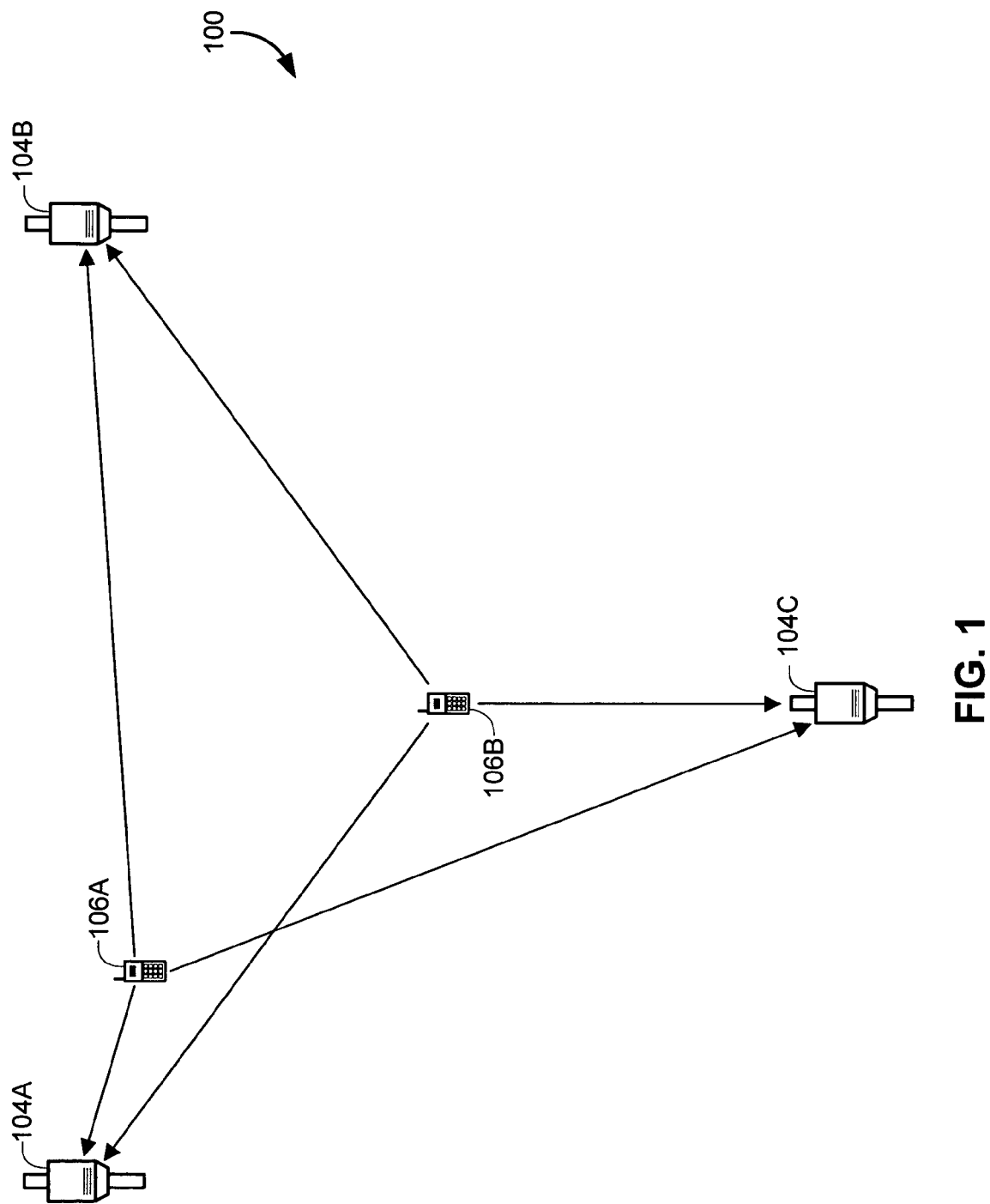
FIG. 1 is a general block diagram of a wireless communication system capable of supporting a number of users.

The word "exemplary" is used herein to mean "serving as an example, instance, or illustration." Any embodiment described herein as "exemplary" is not necessarily to be construed as preferred or advantageous over other embodiments.

The term dedicated channel is used herein to refer to a transport channel that is dedicated to a specific user. A dedicated channel carries information to or from a specific subscriber unit/user equipment. A dedicated channel resource can be identified by a certain code on a certain frequency and is typically reserved for a single user only. A dedicated channel typically carries all information intended for a given user coming from layers above the physical layer, including data for the actual service as well as higher layer control information.

The term common channel is used herein to refer to a transport channel that carries information to/from multiple subscriber units/UEs. A common channel is not dedicated to a specific user, but instead carrier information that is shared among all subscriber units/UEs. A common channel is divided between all or a group of users in a cell. Common channels do not have soft handover.

The term Point-to-Point (PTP) communication is used herein to mean a communication transmitted over a dedicated communication channel.

The term broadcast communication or Point-to-Multipoint (PTM) communication are used herein to refer to a communication over a common communication channel to a plurality of subscriber stations/user equipment.

The term physical channel is used herein to refer to a channel that carries user data or control information over the air interface. A physical channel typically comprises the combination of frequency scrambling code and channelization code. In the uplink direction, relative phase is also included. A number of different physical channels are used in the uplink direction based upon what the subscriber unit/user equipment is attempting to do. Physical channels are defined by physical mappings and attributes used to transfer data over the air interface. Physical channels are the "transmission media" that provide the radio platform through which the information is actually transferred, and serve to carry signaling and user data over the radio link.

The term transport channel is used herein to mean a communication route for data transport between peer physical layer entities. A transport channel is defined by how and with what characteristics data is transferred over the air interface on the physical layer, for example, whether using dedicated or common physical channels, or multiplexing of logical channels. Transport channels can be used to carry signaling and user data between the Medium Access Control (MAC) layer and the Physical Layer (LI). The Radio Network Controller (RNC) sees transport channels. Information is passed to the physical layer from the MAC layer over any one of a number of transport channels that are mapped to physical channels.

A Logical Channel is an information stream dedicated to the transfer of a specific type of information or the radio interface. Logical Channels are provided on top of the MAC layer. A logical channel is defined by what type of information is transferred, for example, signaling or user data, and can be understood as different tasks the network and terminal should perform at different point in time.

The term reverse link uplink channel is used herein to refer to a unidirectional communication channel/link through which the subscriber unit/user equipment sends signals to a base station in the Radio Access Network (RAN). The Uplink Channel may also be used to transmit signals from a mobile station to a mobile base station or from a mobile base station to a base station.

The term forward link or downlink channel is used herein to mean a communication channel/link through which a Radio Access Network (RAN) sends signals to a wireless communicator/subscriber unit/user equipment.

The term remote station/base station/node B is used herein to mean the hardware to or from which subscriber stations/user equipment send or receive communication signals. Cell refers to the hardware or a geographic coverage area, depending on the context in which the term is used. A sector is a partition of a cell. Because a sector has the attributes of a cell, the teachings described in terms of cells are readily extended to sectors.

The term wireless communicator/subscriber station/User Equipment (UE) is used herein to mean the hardware to or from which an access network send or receives communication signals. A subscriber station/user equipment may be mobile or stationary. A wireless communicator/subscriber station/user equipment may be any data device or terminal that communicates through a wireless channel or through a wired channel, for example using fiber optic or coaxial cables. A wireless communicator/subscriber station/user equipment may further be any of a number of types of devices including but not limited to PC card, compact flash, external or internal modem, or wireless or wireline phone.

The term soft handoff is used herein to mean a communication between a subscriber station and two or more sectors, wherein each sector belongs to a different cell. The reverse link communication is received by both sectors, and the forward link communication is simultaneously carried on the two or more sectors' forward links.

The term softer handoff is used herein to mean a communication between a subscriber station and two or more sectors, wherein each sector belongs to the same cell. The reverse link communication is received by both sectors, and the forward link communication is simultaneously carried on one of the two or more sectors' forward links.

Overview

In the description that follows, an exemplary communication system will be described. Then an exemplary wireless communicator and techniques for selecting a serving sector will be described. Thereafter, more optimal serving sector selection mechanisms will be described which utilize techniques for conveying sector load information to the wireless communicator. In general, the embodiments described address the need for improved serving sector selection mechanisms by providing techniques for conveying sector load information to the wireless communicator. According to one aspect, the wireless communicator can use continuous carrier-to-interference (C/I) ratio measurements and sector load information for each of its Active Set (AS) sectors (or all sectors in its Active Set (AS)) to autonomously determine a new/best serving sector.

Exemplary Communication System

FIG. 1 is a diagram of a wireless communication system 100 which may be designed to support one or more CDMA standards and/or designs (e.g., the W-CDMA standard, the IS-95 standard, the cdma2000 standard, the HDR specification, the 1xEV-DV standard). In an alternative embodiment, system 100 may also deploy any wireless standard or design other than a CDMA system.

For simplicity, system 100 is shown to include three base stations 104 in communication with two mobile stations 106. The base station and its coverage area are often collectively referred to as a "cell." In IS-95 systems, a cell may include one or more sectors. In the W-CDMA specification, each sector of a base station and the sector's coverage area is referred to as a cell. Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

As described above, a wireless communication system 100 may support multiple users sharing the communication resource simultaneously, such as an IS-95 system, may allocate the entire communication resource to one user at time, such as an IS-856 system, or may apportion the communication resource to allow both types of access. A 1xEV-DV system is an example of a system which divides the communication resource between both types of access, and dynamically allocates the apportionment according to user demand.

In a 1xEV-DV system, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon scheduling algorithms.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission which supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel or R-CQICH. The scheduling algorithm is used to determine the mobile station selected for transmission, as well as the appropriate rate and transmission format in accordance with the channel quality.

Exemplary Channels

A typical data communication system may include one or more channels of various types. More specifically, one or more data channels are commonly deployed. It is also common for one or more control channels to be deployed, although in-band control signaling may be included on a data channel. For example, in a 1xEV-DV system, a Forward Packet Data Control Channel (F-PDCCH) and a Forward Packet Data Channel (F-PDCH) are defined for transmission of control and data, respectively, on the forward link.

The Forward Packet Data Channel (F-PDCH) is a shared packet data channel which supports high-speed operation traffic. Access to the channel is handled through MAC layer scheduling. This channel is different from all other channels because of adaptive modulation and coding. Also, variable Walsh code space is utilized. Namely, modulation and coding can change from frame to frame as directed by the MAC layer based on the feedback information from the mobile station. The feedback information is contained in the R-CQICH—which reports the pilot chip energy, Ec to total noise density, Nt, ratio, Ec/Nt of the strongest received F-PICH—and in the R-ACKCH, which indicates whether the frame reception was successful. The selected modulation and coding also depend on the available Walsh codes. Unlike all other channels, the F-PDCH utilizes only leftover resources at the base station. This means which the power as well as the Walsh codes space consumed by the F-PDCH can change from frame to frame.

The Forward Packet Data Control Channel (F-PDCCH) is a shared channel that is used primarily to convey information about the F-PDCH transmission format. Data transmission on the F-PDCH is accompanied by Layer 2 control information transmitted in parallel over the F-PDCCH. The control information can allow for correct demodulation and decoding of the associated F-PDCH frame.

The Reverse Channel Quality Indicator Channel (R-CQICH) is a support channel for adaptive coding and modulation over the F-PDCH. The channel is used to convey the F-PICH Ec/Nt, to the serving base station. This information is used for choosing the appropriate modulation and coding scheme. Moreover, a mobile and in some cases two mobiles which are selected for transmission over the F-PDCH can be chosen based on the predetermined fairness metric and the R-CQICH value. The information which is transported over the channel may be a full 4-bit coded value of the F-PICH Ec/Nt, or an up/down indication relative to the previous accumulated value. The R-CQICH is also used to indicate the base station to which the reported F-PICH Ec/Nt corresponds. The index of the R-CQICH Walsh cover identifies that base station.

Figure 2:
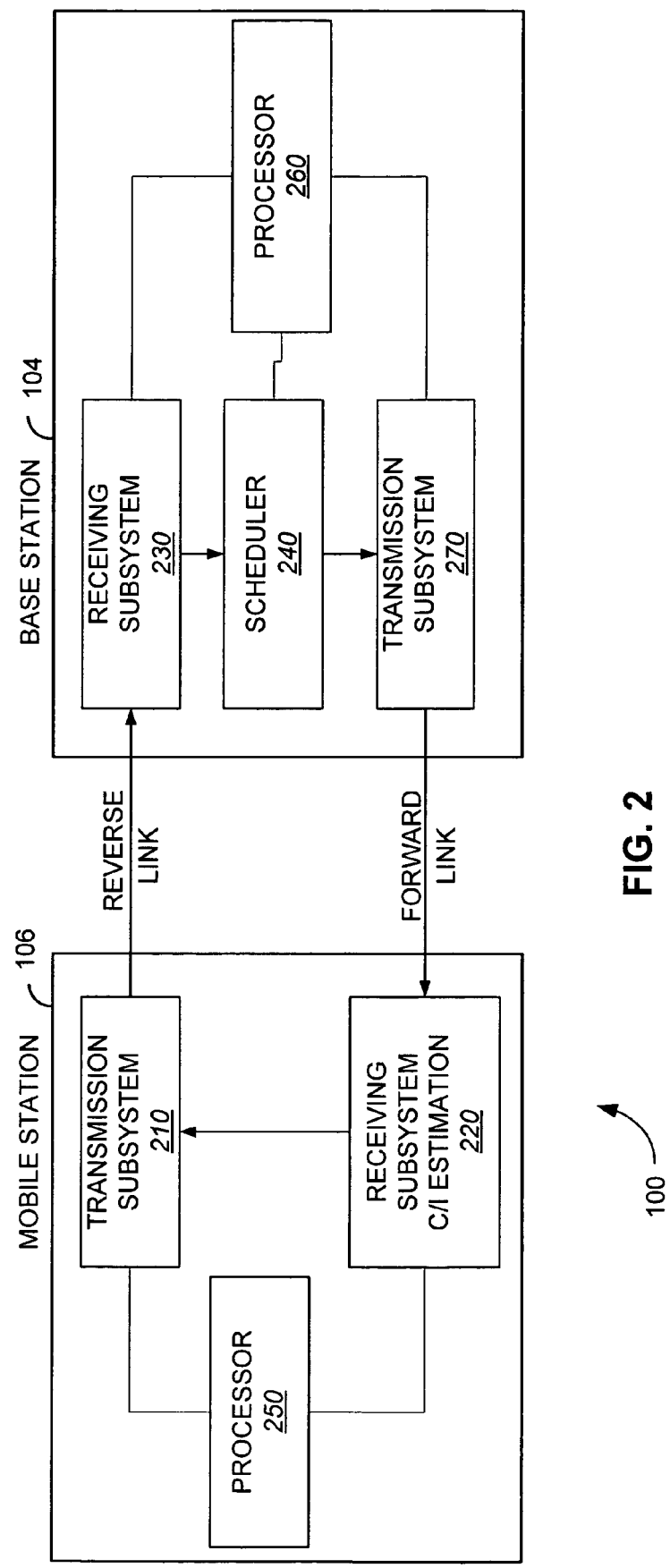
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics may be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm may be deployed within the scope of the present invention. One example is disclosed in U.S. Pat. No. 6,335,922, entitled "METHOD AND APPARATUS FOR FORWARD LINK RATE SCHEDULING," filed Feb. 11, 1997 and issued Jan. 1, 2002 to Tiedemann et al., assigned to the assignee of the present invention.

In an example 1xEV-DV embodiment, a mobile station is selected for forward link transmission when the C/I measurement received from which mobile station indicates which data may be transmitted at a certain rate. It is advantageous, in terms of system capacity, to select a target mobile station such which the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be which a mobile station, with a relatively lower reported C/I, is selected for transmission to maintain a minimum data transfer rate to which user.

In the example 1xEV-DV system, scheduler 240 determines which mobile station to transmit to, and also the data rate, modulation format, and power level for which transmission. In an alternate embodiment, such as an IS-856 system, for example, a supportable rate/modulation format decision may be made at the mobile station, based on channel quality measured at the mobile station, and the transmit format may be transmitted to the serving base station in lieu of the C/I measurement. Those of skill in the art will recognize myriad combinations of supportable rates, modulation formats, power levels, and the like which may be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 270 to transmit to the selected mobile station on the forward link using the selected rate, modulation format, power level, and the like.

In the example embodiment, messages on the control channel, or F-PDCCH, are transmitted along with data on the data channel, or F-PDCH. The control channel may be used to identify the recipient mobile station of the data on the F-PDCH, as well as identifying other communication parameters useful during the communication session. A mobile station should receive and demodulate data from the F-PDCH when the F-PDCCH indicates which mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from non-collocated base stations would require significant network communication bandwidth with very little delay, and so the example systems listed above do not support it. In softer handoff, reverse link signals received at multiple sectors in a single BTS may be combined without network signaling. In the example systems described above, reverse link power control maintains quality such which reverse link frames are successfully decoded at one BTS (switching diversity).

Exemplary Wireless Communicator

Figure 3:
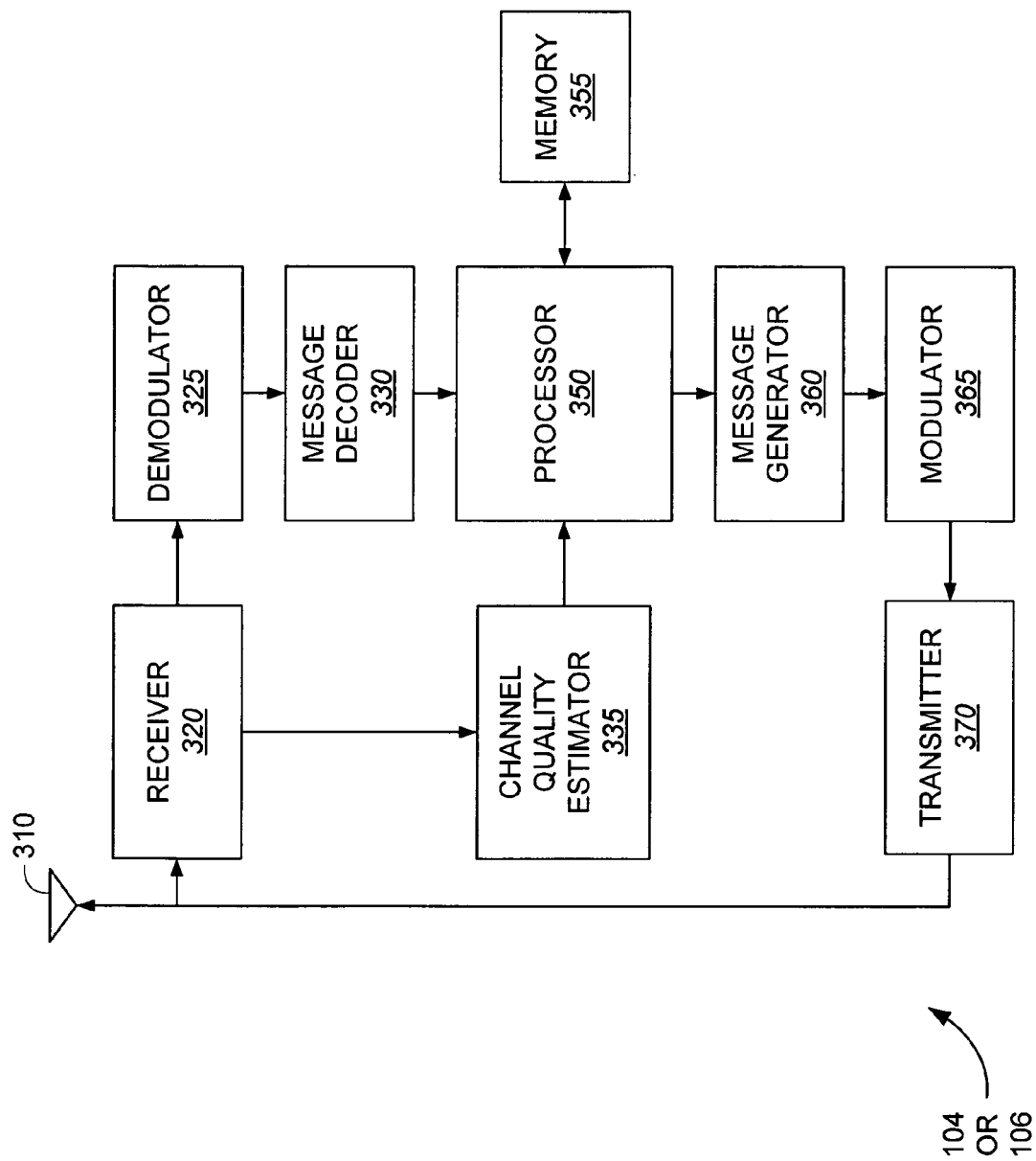
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 325 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels which may be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples).

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. In a base station 104 or mobile station 106, signal strength estimations, such as received pilot power may be made. Channel quality estimator 335 is shown as a discrete block for clarity of discussion only. It is common for such a block to be incorporated within another block, such as receiver 320 or demodulator 325. Various types of signal strength estimates may be made, depending on which signal or which system type is being estimated. In general, any type of channel quality metric estimation block may be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to the desired set point. The desired set point may be determined with an outer loop power control mechanism, as described above.

Signals are transmitted via antenna 310. Transmitted signals are formatted in transmitter 370 according to one or more wireless system standards, such as those listed above. Examples of components which may be included in transmitter 370 are amplifiers, filters, digital-to-analog (D/A) converters, radio frequency (RF) converters, and the like. Data for transmission is provided to transmitter 370 by modulator 365. Data and control channels may be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types.

Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which may be used for storing data as well as instructions for performing the various procedures and methods described herein. Those of skill in the art will recognize which memory 355 may be comprised of one or more memory components of various types, which may be embedded in whole or in part within processor 350.

As described above, in a data system such as 1xEV-DV, it is desirable which the reverse link traffic channels be decoded with high probability in at least one of the base stations (Switching Diversity) and the interference to all reverse link base stations should be minimized. In addition, reliable reception of the R-CQICH is desired at the serving base station. The R-CQICH provides fast forward link channel condition updates for the BTS to efficiently operate the F-PDCH.

Figure 4:
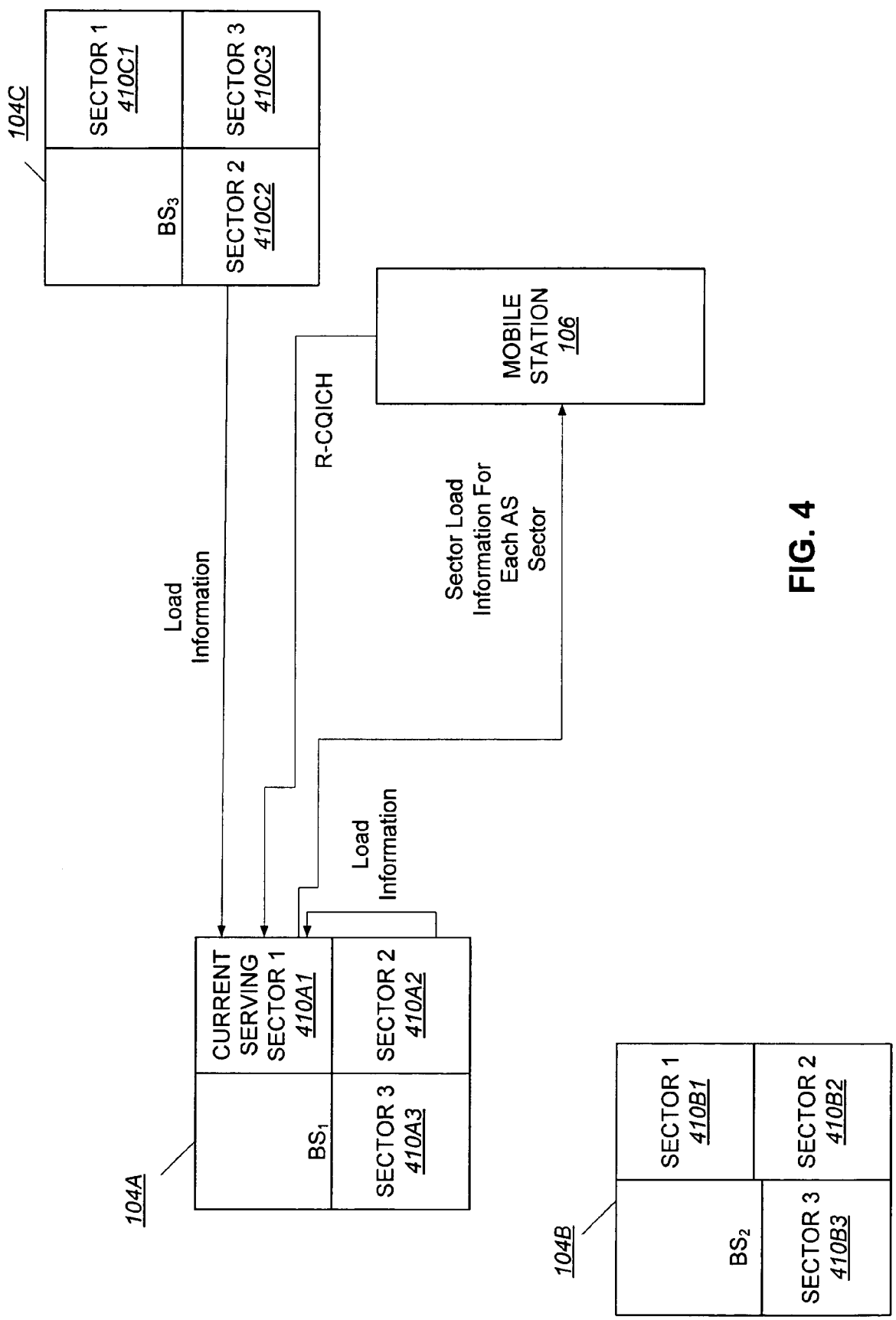
FIG. 4 depicts an example embodiment of a system for controlling a serving base station and non-serving base stations.

FIG. 4 depicts an example embodiment of a system for controlling the current serving sector 410A1 and for controlling the non-serving sectors 410A2, 410B1, B2, 410C2. The mobile station 106 receives a forward link power control stream from each Active Set base station 104A-104C, the F-CPCCH. In this example, each base station 104A-104C, $BS_1$-$BS_3$, respectively, includes three sectors, sectors 1-3, labeled 410A1-410C3, respectively. In this example, the Active Set includes sectors 410A1-2, 410B1-2, and 410C2. This is an example of so-called soft-softer handoff, since the mobile station is in handoff with multiple base stations (soft) as well as multiple sectors within one or more base stations (softer). The mobile station 106 is provided reverse link power control feedback from every Active Set sector. The R-CQICH is directed from the mobile station 106 to the serving sector.

Serving Sector Selection

Forward Packet Data Channel Operation

F-PDCH enables efficient utilization of BS resources for delay-tolerant traffic. It is a shared channel, and short-term radio channel variations due to fading can be exploited at the expense of delay jitter. With smart scheduling, fading can actually significantly improve the efficiency of the air interface. The efficiency improvement is due to multiuser diversity. In point-to-multipoint links, such as the one which exists between a single BS and the MSs in a given cell, the radio propagation channel varies independently. The BS can then choose to allocate its resources to a MS which experiences the best radio propagation environment among all mobiles in that cell and thus maximize the throughput. Selecting a MS among a group of mobiles is commonly called multiuser diversity.

Moreover, if there is no fairness constraint imposed on the BS scheduler, the BS can schedule MSs which can support the highest data rate, and some MSs may not receive any data at all. A scheduling algorithm can be used which enables multiuser diversity effect, satisfies some fairness criteria and minimizes physical layer throughput variation. The scheduling interval corresponds to a single frame, which can be 1.25 ms, 2.5 ms, or 5 ms. The data rate is determined from the channel quality information and the available BS resources. The forward-link control channel informs the MS when it has been scheduled on the F-PDCH. The entity which controls F-PDCH operation is called PDCH Control Function (PDCHCF). This entity controls link adaptation, scheduling, and H-ARQ type II operation, and it is responsible for mapping f-pdch logical channels to the corresponding physical channels. PDCHCF is considered part of the MAC Layer and can be implemented at the BTS.

Control Signaling

The F-PDCH is a shared channel which the BS grants access on for up to 5 ms. Such a short access requires a fast signaling protocol to alert the MS. The BS uses F-PDCCH, which operates in parallel to the F-PDCH. The F-PDCCH frame length is typically equal to the F-PDCH frame length. The MS buffers the signal received on F-PDCCH and F-PDCH. The F-PDCCH is decoded considering all three possible frame lengths, 1.25, 2.5, and 5 ms.

Standard F-PDCCH Control Message

FIG. 5 is a standard F-PDCCH control message which contains 21 bits. In addition, there are 16 bits for CRC and 8 encoder tail bits.

In the control message itself, the first 8 bits are reserved for the MAC_ID, which identifies a MS. The BS typically sets the MAC Identifier (MAC_ID) field, which specifies a MAC identifier, to the MAC identifier assigned to the MS which is to decode a F-PDCH subpacket transmission concurrent with the transmission of this message on the F-PDCH. The scope of the MAC_ID is per CDMA channel, or pilot. When the MS performs handoff to another pilot, the MAC_ID can change. The MAC_ID is initially communicated to the MS via Extended Channel Assignment Message (ECAM) and can be subsequently updated in case of a soft handoff event by sending the Universal Handoff Direction Message (UHDM).

A WALSH_MASK field specifies a Walsh space mask bitmap. The BS typically sets this field to the Walsh space mask bitmap to indicate that the MS is to omit certain entries in the packet data channel Walsh set when decoding the F-PDCH. The BS typically sets each bit in this field to '0' or '1' to indicate which the MS is to include ('0') or omit ('1') the corresponding indices in the Walsh index table (WCI).

An EP_SIZE field specifies the encoder packet size. There are six different values which the encoder packet size can take. The MS needs to know the encoder packet size in order to successfully decode the incoming packet. The encoder packet size is contained in a 3-bit EP_SIZE field. EP_SIZE=111 refers to extended message types used for F-PDCCH control messages. If this message contains an extended message, the BS typically sets this field to '111'. Otherwise, the BS typically sets this field to the encoded value for the encoder packet size (other than '111') for the F-PDCH subpacket transmission concurrent with the transmission of this message on the F-PDCH. Control F-PDCCH messages contain only MAC_ID, EP_SIZE=111 and the 10-bit control information.

The MS can simultaneously receive four parallel physical layer data streams, transmitted on four separate ARQ channels. To discriminate between the channels, F-PDCCH message contains a 2-bit field called an ARQ Channel Identifier (ACID). Each ACID supports independent H-ARQ type II operation. The BS typically sets the ARQ channel identifier (ACID) field to the ARQ channel identifier for the F-PDCH subpacket transmission concurrent with the transmission of this message on the F-PDCH.

The BS typically sets the subpacket identifier (SPID) field to the subpacket identifier for the F-PDCH subpacket transmission concurrent with the transmission of this message on the F-PDCH. The BS typically sets the ARQ Identifier Sequence Number (AI_SN) field to the ARQ identifier sequence number for the F-PDCH subpacket transmission concurrent with the transmission of this message on the F-PDDCH. Since the sequence is not mandatory and SPID=00 can be repeated, the MS must be notified when the new encoder packet begins. The ARQ Identifier Sequence Number (AI_SN) bit is added to the F-PDCCH message. The AI_SN bit is toggled whenever new encoder packet transmission begins.

Finally, the F-PDCCH message contains the Last Walsh Code Index (LWCI) which identifies the last Walsh code in the Walsh code tree. Only 28 Walsh codes of length 32 are potentially available for F-PDCH. Exactly which 28 codes are available is signaled to the MS through WALSH_TABLE_ID. The scope of WALSH_TABLE_ID is per pilot. It is a 3-bit field and is part of both ECAM and UHDM. Walsh code space can become fragmented due to, for example, assignment and tear down of F-SCH. The F-PDCCH message, as shown in FIG. 5, cannot address fragmented Walsh space because the LWCI indicates the last code in a contiguous Walsh code space. The BS typically sets the Last Walsh Code Index (LWCI) field to the last Walsh code index for the F-PDCH subpacket transmission concurrent with the transmission of this message on the F-PDCCH. If this message is being transmitted on the F-PDCCH0 physical channel, the BS typically sets this field to indicate which the Walsh code set includes the 0th through $LWCI^{th}$ entries in the WCI table. Otherwise, if this message is being transmitted on the F-PDCCH1 physical channel, the BS typically sets this field to indicate which the Walsh code set includes the $(1wci0+1)^{th}$ h through $LWCI^{th}$ entries in the WCI table. If the MAC_ID in the F-PDCCH0 message transmitted at the same time as this message is greater than or equal to '01000000', then 1wci is the last Walsh code index in the F-PDCCH0 message. If the MAC_ID in the F-PDCCH0 message is less than '01000000', 1wci0 is 1.

To alleviate Walsh fragmentation problem, a special F-PDCCH broadcast message is designed to signal the fragmented Walsh code space available for F-PDCH. The MAC_ID in this message is set to 00000000, which indicates which the message is addressed to all the mobiles in the cell. The availability of the last two Walsh codes of length 32 (descendents of the length-16 Walsh code which is not bitmapped) is signaled through LWCI.

The BS typically sets the Extended Message Type Identifier (EXT_MSG_TYPE) field to '00' or '01'. The BS may set this field to '00' to indicate which the MS is to exit PDCH Control Hold Mode. The BS may set this field to '01' to indicate that the MS is to terminate the current switching transmission pattern prior to the maximum number of switching frames (REV_NUM_SOFT_SWITCH_FRAMESs or REV_NUM_SOFTER_SWITCH_FRAMESs).

The BS typically sets the RESERVED field of reserved bits to '00000000'.

The standard allows simultaneous operation of two F-PDCHs; which is, up to two mobiles can be scheduled at the same time. This flexibility is added for more efficient support of WAP traffic and Layer 3 signaling.

Link Adaptation

The F-PDCH allows adaptive modulation and coding to improve spectral efficiency. The radio channel state information at the MS is communicated to the BS through the Reverse Channel Quality Indicator Channel (R-CQICH). This feedback channel allows the BS to implement a scheduler which exploits channel variability to achieve multiuser diversity gain. It also allows the selection of the optimal F-PDCH data rate given the current channel conditions.

Feedback of Channel Quality

MSs report their channel quality over the R-CQICH. There are two modes allowed, full and differential carrier to interference (C/I) reporting. The full C/I reporting is more accurate than the differential, but it can create more reverse-link overhead.

The full C/I report represents a result of the measurement of pilot chip energy to total noise plus interference ratio Pilot Ec/Nt, mapped to a 4-bit channel quality indicator. In the full mode, the current Pilot Ec/Nt is reported every PCG or 1.25 ms. The differential update is interpreted as a ±0.5 dB correction relative to the most recent accumulated C/I value. The differential scheme itself consists of one full report every 20 ms and 15 ±0.5 dB updates in between. The accumulator sums up the differential updates every PCG and it refreshes itself every 20 ms when the full report is received.

One full report is followed by 15 differential reports. The full report can be repeated in order to improve reliability. In this case, the receiver soft-combines the repeated symbols. The number of times the full C/I report is repeated can be configured by the BS using the REV_CQICH_REP field, part of ECAM, UHDM, and Rate Change Message (RATCHGM). Since R-CQICH needs to be decoded by the serving BS, R-CQICH symbols are repeated and soft-combined to improve reliability. The improved detection comes at the expense of a decreased R-CQICH symbol rate.

Cell Selection and Switching

The MS indicates the serving BS by "covering" the R-CQICH symbol with one of six different Walsh functions of length-8 chips. In the context of R-CQICH operation, such Walsh functions are called Walsh covers. Each R-CQICH transmission is directed (by a distinct Walsh cover) to one particular pilot from which the MS desires to receive packet data channel transmissions. The MS determines the pilot from the packet data channel active set to which the R-CQICH transmission will occur based on the relative received strengths from the pilots in the packet data channel active set. At call setup, through the ECAM (or when the active set is updated through a UHDM), the network signals the PILOT_PN to Walsh cover mapping using the REV_C-QICH_COVER field. The MS expects to be served from the BS associated with the Walsh cover used when C/I is reported.

Typically, the MS achieves selection diversity by selecting the BS with the strongest received pilot signal (Ec/Nt). However, the MS can not instantly change the serving BS because cell switching requires queue synchronization for the outstanding data. When the MS determines that a change of the serving BS pilot is required, the MS invokes a sector/cell switching procedure. To initiate the switch, the MS transmits a distinctive switching pattern on the R-CQICH which indicates to the serving BS that transmission of any outstanding Encoder Packets (EP) should be completed, and that the MS should switch to the target BS once transmissions are complete. During the switching period, the R-CQICH transmissions are modified to use the Walsh cover of the target pilot in the packet data channel active set. The length of the switching period depends on whether the source and target pilots (in the packet data channel active set(AS)) are within the same BTS or are in different cells. The switching period intervals are specified by two parameters—NUM_SOFTER_SWITCHING_FRAMES and NUM_SOFT_SWITCHING_FRAMES, contained in the ECAM or UHDM. The parameter, NUM_SOFTER_SWITCHING_FRAMES, configures the switching procedure in the MS, while the switching delay, PDCH_SOFTER_SWITCHING_DELAY (or PDC_SOFT_SWITCHING_DELAY), simply informs the MS about the possible interruption in service due to switching and network delays because of issues such as queue synchronization.

Optimized Serving Sector Selection Mechanisms

To provide improved serving selection mechanisms, at least two options can be provided. According to a first option, every sector could broadcast its own load value. However, according to this option, the MS must leave the current serving sector to collect the load information from another sector, during which it will not receive data from the current serving sector. Because the broadcast has to run on a predetermined schedule, this would reduce the TDM gain of the shared F-PDCH. According to a second option, the load information for all neighbor sectors can be conveyed by the serving sector. While this might result in multiple redundant transmission of the same information in a number of sectors; however, this is compensated for by the fact that the BS is free to schedule the message transmission in a way to preserve FL capacity. Also, no L3 signaling is needed to disable/enable the feature. The BS can simply elect to send or not to send the load info broadcast message as needed.

Referring again to FIG. 4, in one aspect, a system is provided which includes a plurality of BSs 104A-C each comprising a plurality of sectors 410A1-410C3, and a MS 106, served by a current serving sector 410A1. Each sector can have a plurality of neighbor sectors. Note which serving and non-serving terminology is used only for clarity in the example embodiments. The techniques disclosed apply to any collection of base stations, whether or not they are serving or non-serving base stations. The embodiments could be described replacing "serving" with "primary" and "non-serving" with "other" or "secondary" base stations, and the principles disclosed would apply with equal force.

Each BS 104 determines sector load information, and transmits the sector load information. The MS 106 measures the carrier-to-interference (C/I) ratio for each sector in the MS 106's Active Set (AS), stores the carrier-to-interference (C/I) ratio measurements for the sectors in the MS 106's Active Set (AS), and autonomously determines a new or best serving sector based on the carrier-to-interference (C/I) ratio measurements and the sector load information for each of the AS sectors. In one embodiment, the current serving sector transmits the sector load information for all neighbor sectors to the MS 106. Alternatively, each sector may transmit a load value corresponding to its sector load information.

The BS 104s can transmit the sector load information using a dedicated channel, such as, a forward link channel transmitted to a single MS 106. In one implementation, the dedicated channel is a forward packet data channel (F-PDCH) or a forward packet data control channel (F-PDCCH). In another implementation, the dedicated channel used to carry the sector load information is a forward fundamental channel (F-FCH) or a forward dedicated control channel (F-DCCH).

In another embodiment, the BS 104s multicast the sector load information using a common channel. The common channel can be, for example, a forward link channel transmitted to all MS 106's served by the sector. In one implementation, the common channel comprises a forward packet data channel (F-PDCH), wherein a single F-PDCH message carries load information for more than one sector. In another implementation, the common channel used to carry the sector load information is a shared forward fundamental channel, a shared forward dedicated control channel, a shared forward supplemental channel, a paging channel (PCH), a forward broadcast control channel (F-BCCH), or a forward common control channel (F-CCCH).

In still another embodiment, the sector load information comprises a load information broadcast message sent, for example, either on the F-PDCH, or on the F-PDCCH to all MS's served by the sector. For the broadcast method, a new message can be sent on the F-PDCCH, preferably on F-PDCCH1. It should be appreciated, however, that other suitable formats can also be used, in particular, there can be formats defined in which a single F-PDCCH message may carry load information for more than one sector.

FIG. 6 is a modified F-PDCCH control message according to an aspect of the invention. This modified control message can be used to convey the sector load information. In one aspect, a new message type can be used, where the message lists PN_OFFSET values and corresponding load value information. In one embodiment, the sector load information comprises a load information message comprising PN_OFFSET field which includes PN_OFFSET values and a PN_LOAD field which includes corresponding load value information. In one implementation, the PN_OFFSET field specifies a Pilot PN offset, and the PN_LOAD field specifies sector load parameter. In the case when the load information is sent in a dedicated to manner to a particular user, the PN_OFFSET field may be replaced by the Walsh cover index corresponding to that PN_OFFSET. This reduces the required message length because the Walsh cover index is typically a 3-bit value, while the PN_OFFSET is typically a 9-bit value. The same substitution of the PN_OFFSET is not expected to work in the case of load information broadcast, however, because the PN_OFFSET-to-Walsh cover index mapping varies from mobile station to mobile station. The sector load information can be included, for example, in other existing CDMA2000 Layer 3 (L3) messages, such as the Extended Channel Assignment Message (ECAM) or Universal Handoff Direction Message (UHDM), for example.

In this implementation, the load information broadcast message may also include a MAC_ID field and a WALSH_MASK field. The base station typically sets the MAC Identifier (MAC_ID) field, which specifies a MAC identifier, to the MAC identifier assigned to the mobile station which is to decode a F-PDCH subpacket transmission concurrent with the transmission of this message on the F-PDCH.

If the MAC_ID has a first value, the BS 104 includes the WALSH_MASK field in the load information broadcast message and omits other fields. The other remaining fields may comprise, for example, an EP_SIZE field, an ACID field, a SPID field, an AI_SN field, a LWCI field, EXT_MSG_TYPE field, and a RESERVED field. For example, if the MAC_ID is set to '00000000', the base station includes the WALSH_MASK field and omits the remaining fields.

If the MAC_ID has a second value, the BS 104 includes the PN_OFFSET and PN_LOAD fields in the load information broadcast message. For example, if the MAC_ID is set to '00000001', the base station can include the PN_OFFSET and PN_LOAD fields.

If the MAC_ID has a third value, the BS 104 includes the REV_CQICH_COVER (the index of the Walsh cover corresponding to an AS sector pilot) and PN_LOAD fields in the dedicated load information message transmitted on the F-PDCCH.

If the MAC_ID has a fourth value, the BS 104 includes the PN_OFFSET and PN_LOAD fields in the load information broadcast message transmitted on the F-PDCH.

If the MAC_ID has another value, the BS 104 includes other remaining fields and omits the WALSH_MASK field, PN_OFFSET field and PN_LOAD filed in the load information broadcast message. For example, the base station can omit the WALSH_MASK and PN_OFFSET and PN_LOAD fields and include the remaining fields.

Figure 7:
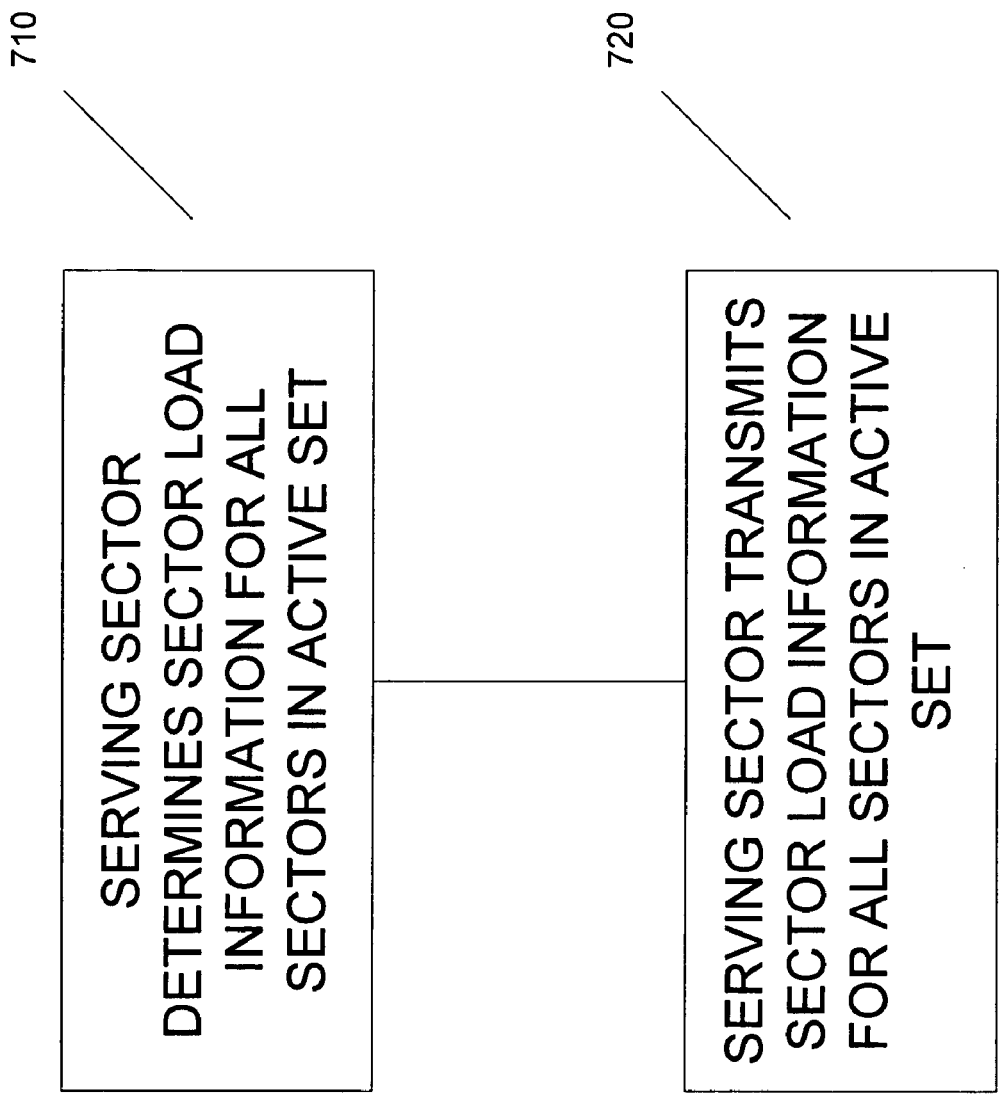
FIG. 7 is a flow diagram which details operations of a remote station according to another aspect of the invention.

FIG. 7 is a flow diagram which details operations of remote station according to another aspect of the invention. In this aspect, a BS 104 is provided which includes a plurality of sectors, a processor, and a transmitter. Each sector can have a plurality of neighbor sectors. At step 710, the processor determines sector load information, and at step 720, the transmitter transmits the sector load information. A current serving sector transmits the sector load information for all neighbor sectors. The sector load information could be sent, for example, using the F-PDCH or other appropriate FL channels in a dedicated fashion to each user separately.

Figure 8:
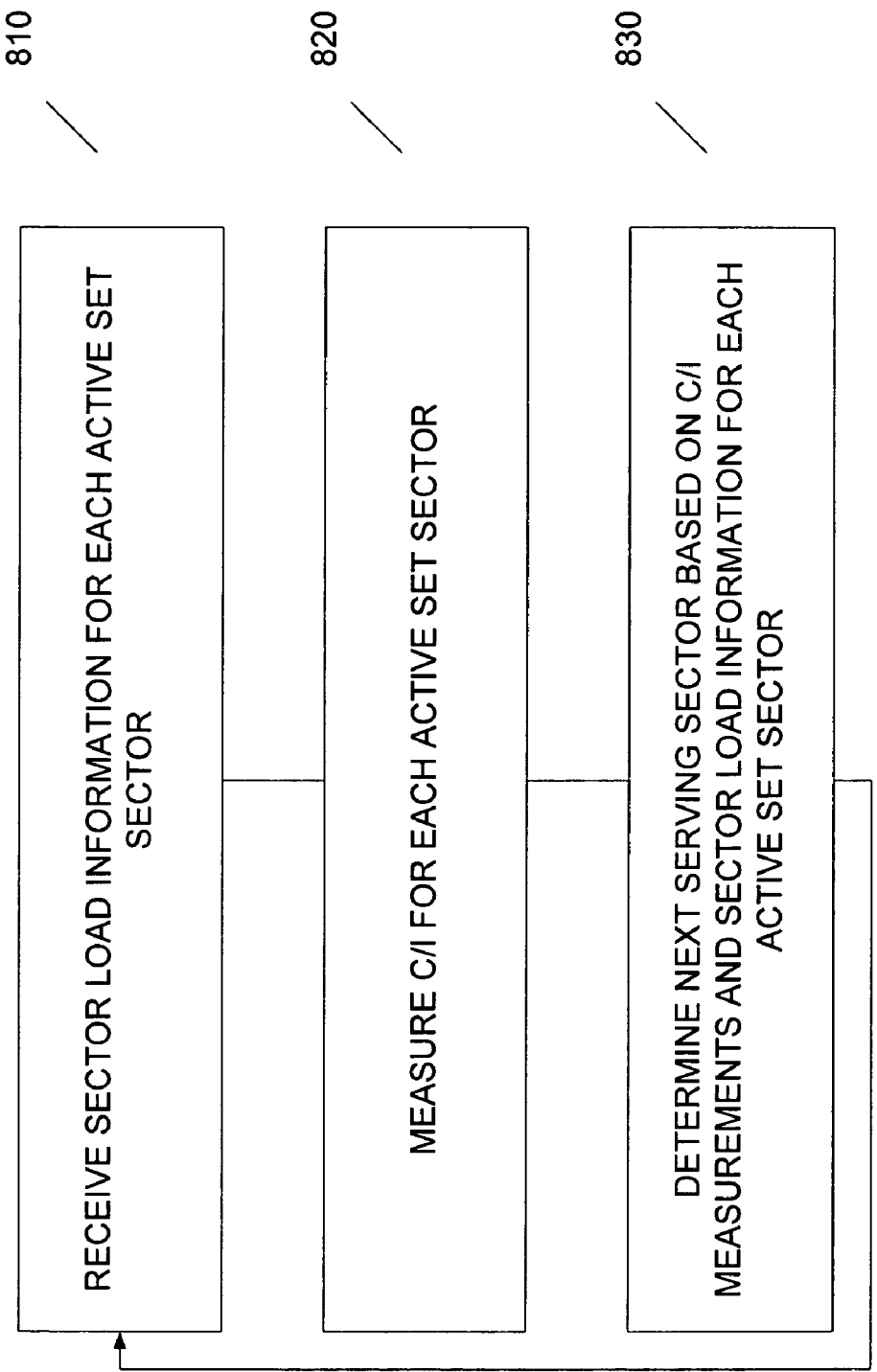
FIG. 8 is a flow diagram which details operations of a wireless communicator according to yet another aspect of the invention.

FIG. 8 is a flow diagram which details operations of wireless communicator according to yet another aspect of the invention. In this another aspect, a MS 106 is provided which is served by a current serving sector. The MS 106 includes a receiver, a channel quality estimator 335, a memory, and a processor. At step 810, the receiver receives sector load information for each sector in the MS 106's Active Set (AS). At step 820, the channel quality estimator 335 measures the carrier-to-interference (C/I) ratio for each sector in the MS 106's Active Set (AS). The memory 355 stores the carrier-to-interference (C/I) ratio measurements for the sectors in the MS 106's Active Set (AS). At step 830, the processor autonomously determines a new serving sector based on the carrier-to-interference (C/I) ratio measurements and sector load information for each of the AS sectors. In the embodiment, of FIG. 6, the sector load information can include a load information broadcast message comprising a PN_OFFSET field which includes PN_OFFSET values and a PN_LOAD field which includes corresponding load value information. The default value of PN_LOAD for a pilot can be '0000', if no F-PDCCH message was received in which the PN_OFFSET field value corresponds to which pilot. If the last update of PN_LOAD was more than $T_x$ time ago, PN_LOAD could be reset to '0000'. Either the $T_x$ value, or the default PN_LOAD, or both may be defined in the Standard or signaled by L3, or both.

The memory 355 stores the PN_LOAD value if the processor determines that the value of PN_OFFSET matches any of the AS sector pilots. Alternatively, all PN_LOAD values may be stored for future use when a received UHDM adds new sector pilots to the AS.

The processor, upon determining the new serving sector, can modify the measured the carrier-to-interference (C/I) ratio value to be used in the new serving sector selection, based on the corresponding value of PN_LOAD. In one implementation, the processor adds a scaled version of the corresponding value of PN_LOAD to the measured the carrier-to-interference (C/I) ratio value. In one embodiment, when the MS determines the best serving sector, it may modify the measured C/I value (expressed in dB) by adding to it the value of PN_LOAD, where PN_LOAD is interpreted as two's complement binary number in units of 1 dB. The range and resolution of the load information could be defined in other ways.

It should be noted that the MS operation is similar regardless of whether the BS chooses to use a dedicated or broadcast procedure to convey the cell load information.

It should also be noted that in all the embodiments described above, method steps may be interchanged without departing from the scope of the invention. The descriptions disclosed herein have in many cases referred to signals, parameters, and procedures associated with the 1xEV-DV standard, but the scope of the present invention is not limited as such. Those of skill in the art will readily apply the principles herein to various other communication systems. These and other modifications will be apparent to those of ordinary skill in the art.

Those of skill in the art will understand which information and signals may be represented using any of a variety of different technologies and techniques. For example, data, instructions, commands, information, signals, bits, symbols, and chips which may be referenced throughout the above description may be represented by voltages, currents, electromagnetic waves, magnetic fields or particles, optical fields or particles, or any combination thereof.

Those of skill will further appreciate which the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A system, comprising:
   a plurality of remote stations each comprising a plurality of sectors, wherein each remote station comprises:
      a processor which determines sector load information; and
      a transmitter which transmits the sector load information; and
   a wireless communicator, served by a current serving sector, comprising:
      a channel quality estimator which measures the carrier-to-interference (C/I) ratio for each sector in the wireless communicator's Active Set (AS);
      a memory which stores the carrier-to-interference (C/I) ratio measurements for the sectors in the wireless communicator's Active Set (AS); and
      a processor which determines a new serving sector based on the carrier-to-interference (C/I) ratio measurements and the sector load information for each of the AS sectors,
   wherein each sector has a plurality of neighbor sectors, and wherein the current serving sector transmits the sector load information for all neighbor sectors to the wireless communicator.

2. A system according to claim 1, wherein the sector load information comprises a load information message comprising PN_OFFSET field which includes PN_OFFSET values and an PN_LOAD field which includes corresponding load value information.

3. A system according to claim 2, wherein the sector load information is included in an Channel Assignment Message (CAM).

4. A system according to claim 2, wherein the sector load information is included in a Handoff Direction Message (HDM).

5. A system according to claim 1, wherein the remote stations transmit the sector load information using a dedicated channel.

6. A system according to claim 5, wherein the dedicated channel is a forward link channel transmitted to a single wireless communicator.

7. A system according to claim 1, wherein the dedicated channel is a forward packet data channel (F-PDCH).

8. A system according to claim 1, wherein the remote stations multicast the sector load information using a common channel.

9. A system according to claim 8, wherein the common channel is a forward link channel transmitted to all wireless communicator's served by the sector.

10. A system according to claim 9, wherein the common channel is a forward packet data channel (F-PDCH), wherein a single F-PDCH message carries load information for more than one sector.

11. A system according to claim 9, wherein the dedicated channel is a forward packet data control channel (F-PDCCH).

12. A system according to claim 1, wherein the sector load information comprises a load information broadcast message comprising PN_OFFSET field which includes PN_OFFSET values and an PN_LOAD field which includes corresponding load value information.

13. A system according to claim 12, wherein the load information broadcast message further comprises a MAC_ID field and a WALSH_MASK field.

14. A system according to claim 13, wherein if the MAC_ID has a first value, the remote station includes the WALSH_MASK field in the load information broadcast message and omits other fields.

15. A system according to claim 13, wherein if the MAC_ID has a second value, the remote station includes the PN_OFFSET and PN_LOAD fields in the load information broadcast message.

16. A system according to claim 13, wherein if the MAC_ID has a third value, the remote station includes the PN_OFFSET and PN_LOAD fields in the load information broadcast message transmitted on the F-PDCH.

17. A system according to claim 13, wherein if the MAC_ID has another value, the remote station includes other remaining fields and omits the WALSH_MASK field, PN_OFFSET field and PN_LOAD filed in the load information broadcast message.

18. A system according to claim 13, wherein the other remaining fields comprise an EP_SIZE field, an ACID field, a SPID field, an Al_SN field, a LWCI field, EXT_MSG_TYPE field, and a RESERVED field.

19. A system according to claim 1, wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

20. A system according to claim 19, wherein the wireless communicator, upon determining the new serving sector, modifies the measured the carrier-to-interference (C/I) ratio value to be used in the new serving sector selection, based on the corresponding value of PN_LOAD.

21. A system according to claim 19, wherein the wireless communicator, upon determining the new serving sector, adds the corresponding value of PN_LOAD to the measured the carrier-to-interference (C/I) ratio value.

22. A system according to claim 1, wherein each sector transmits a load value corresponding to its sector load information.

23. A wireless communicator, served by a current serving sector, comprising:
a receiver which receives sector load information for each sector in the wireless communicator's Active Set (AS);
a channel quality estimator which measures the carrier-to-interference (C/I) ratio for each sector in the wireless communicator's Active Set (AS);
a memory which stores the carrier-to-interference (C/I) ratio measurements for the sectors in the wireless communicator's Active Set (AS); and
a processor which determines a new serving sector based on the carrier-to-interference (C/I) ratio measurements and sector load information for each of the AS sectors,
wherein each sector has a plurality of neighbor sectors, and wherein the current serving sector transmits the sector load information for all neighbor sectors to the wireless communicator.

24. A wireless communicator according to claim 23, wherein the sector load information comprises a load information message comprising PN_OFFSET field which includes PN_OFFSET values and an PN_LOAD field which includes corresponding load value information.

25. A wireless communicator according to claim 24, wherein the sector load information is included in an Channel Assignment Message (CAM).

26. A wireless communicator according to claim 24, wherein the sector load information is included in a Handoff Direction Message (HDM).

27. A wireless communicator according to claim 23, wherein the sector load information is received over a dedicated channel.

28. A wireless communicator according to claim 27, wherein the dedicated channel is a forward link channel transmitted only to the wireless communicator.

29. A wireless communicator according to claim 23, wherein the dedicated channel is a forward packet data channel (F-PDCH).

30. A wireless communicator according to claim 23, wherein the sector load information is received over a common channel.

31. A wireless communicator according to claim 30, wherein the common channel is a forward link channel transmitted to more than one wireless communicator served by the sector.

32. A wireless communicator according to claim 31, wherein the common channel is a forward packet data channel (F-PDCH), wherein a single F-PDCH message carries load information for more than one sector.

33. A wireless communicator according to claim 31, wherein the dedicated channel is a forward packet data control channel (F-PDCCH).

34. A wireless communicator according to claim 23, wherein the sector load information comprises a load information broadcast message comprising PN_OFFSET field which includes PN_OFFSET values and an PN_LOAD field which includes corresponding load value information.

35. A wireless communicator according to claim 34, wherein the load information broadcast message further comprises a MAC_ID field and a WALSH_MASK field.

36. A wireless communicator according to claim 35, wherein if the MAC_ID has a first value, the load information broadcast message includes the WALSH_MASK field an no other fields.

37. A wireless communicator according to claim 35, wherein if the MAC_ID has a second value, the load information broadcast message includes the PN_OFFSET and PN_LOAD fields.

38. A wireless communicator according to claim 35, wherein if the MAC_ID has a third value, the load information broadcast message includes the PN_OFFSET and PN_LOAD fields and is received over the F-PDCH.

39. A wireless communicator according to claim 35, wherein if the MAC_ID has another value, the load information broadcast message includes other remaining fields and does not include the WALSH_MASK field, PN_OFFSET field and PN_LOAD filed.

40. A wireless communicator according to claim 35, wherein the other remaining fields comprise an EP_SIZE field, an ACID field, a SPID field, an Al_SN field, a LWCI field, EXT_MSG_TYPE field, and a RESERVED field.

41. A wireless communicator according to claim 23, wherein the sector load information comprises a load information broadcast message comprising PN_OFFSET field which includes PN_OFFSET values and a PN_LOAD field which includes corresponding load value information, and wherein the memory stores the PN_LOAD value if the processor determines which the value of PN_OFFSET matches any of the AS sector pilots.

42. A wireless communicator according to claim 41, wherein the processor, upon determining the new serving sector, modifies the measured the carrier-to-interference (C/I) ratio value to be used in the new serving sector selection, based on the corresponding value of PN_LOAD.

43. A wireless communicator according to claim 41, wherein the processor, upon determining the new serving sector, adds the corresponding value of PN_LOAD to the measured the carrier-to-interference (C/I) ratio value.

44. A wireless communicator according to claim 23, wherein each sector transmits a load value corresponding to its sector load information.

45. A method, comprising:
determining sector load information for a plurality of sectors comprising a current serving sector;
transmitting, by a transmitter, the sector load information; and
measuring the carrier-to-interference (C/I) ratio for each sector in an Active Set (AS);
storing the carrier-to-interference (C/I) ratio measurements for the sectors in the Active Set (AS); and
determining a new serving sector based on the carrier-to-interference (C/I) ratio measurements and the sector load information for each of the AS sectors,
wherein each sector has a plurality of neighbor sectors, and wherein the current serving sector transmits the sector load information for all neighbor sectors.

46. A method according to claim 45, wherein the sector load information comprises a load information message comprising PN_OFFSET field which includes PN_OFFSET values and an PN_LOAD field which includes corresponding load value information.

47. A method according to claim 45, wherein the sector load information is transmitted on a dedicated channel.

48. A method according to claim 45, wherein the dedicated channel is a forward packet data channel (F-PDCH).

49. A method according to claim 45, wherein the sector load information is multicast on a common channel.

50. A method according to claim 45, wherein the sector load information comprises a load information broadcast message comprising PN_OFFSET field which includes PN_OFFSET values and an PN_LOAD field which includes corresponding load value information.

51. A method according to claim 45, wherein the sector load information comprises a load information broadcast message comprising PN_OFFSET field which includes PN_OFFSET values and PN_LOAD field which includes corresponding load value information, and wherein the PN_LOAD value is stored if the value of PN_OFFSET matches any of the AS sector pilots.

52. A method according to claim 51, wherein upon determining the new serving sector:
modifying measured the carrier-to-interference (C/I) ratio value to be used in the new serving sector selection, based on the corresponding value of PN_LOAD.

53. A method according to claim 45, wherein each sector transmits a load value corresponding to its sector load information.

54. A method for use with a wireless communicator being served by a current serving sector, comprising:
receiving, by a receiver, sector load information for each sector in the wireless communicator's Active Set (AS);
measuring the carrier-to-interference (C/I) ratio for each sector in the wireless communicator's Active Set (AS);
storing the carrier-to-interference (C/I) ratio measurements for the sectors in the wireless communicator's Active Set (AS); and
determining a new serving sector based on the carrier-to-interference (C/I) ratio measurements and sector load information for each of the AS sectors,
wherein each sector has a plurality of neighbor sectors, and
wherein the current serving sector transmits the sector load information for all neighbor sectors to the wireless communicator.

55. A method according to claim 54, wherein the sector load information comprises a load information message comprising PN_OFFSET field which includes PN_OFFSET values and an PN_LOAD field which includes corresponding load value information.

56. A method according to claim 54, wherein the sector load information is received over a dedicated channel.

57. A method according to claim 54, wherein the dedicated channel is a forward packet data channel (F-PDCH).

58. A method according to claim 54, wherein the sector load information is received over a common channel.

59. A method according to claim 54, wherein the sector load information comprises a load information broadcast message comprising PN_OFFSET field which includes PN_OFFSET values and an PN_LOAD field which includes corresponding load value information.

60. A method according to claim 54, wherein the sector load information comprises a load information broadcast message comprising PN_OFFSET field which includes PN_OFFSET values and a PN_LOAD field which includes corresponding load value information, and wherein the memory stores the PN_LOAD value if the processor determines which the value of PN_OFFSET matches any of the AS sector pilots.

61. A method according to claim 60, wherein the processor, upon determining the new serving sector, modifies the measured the carrier-to-interference (C/I) ratio value to be used in the new serving sector selection, based on the corresponding value of PN_LOAD.

62. A method according to claim 54, wherein each sector transmits a load value corresponding to its sector load information.

63. A wireless communicator being served by a current serving sector, comprising:
means for receiving sector load information for each sector in the wireless communicator's Active Set (AS);
means for measuring the carrier-to-interference (C/I) ratio for each sector in the wireless communicator's Active Set (AS);
means for storing the carrier-to-interference (C/I) ratio measurements for the sectors in the wireless communicator's Active Set (AS); and
means for determining a new serving sector based on the carrier-to-interference (C/I) ratio measurements and sector load information for each of the AS sectors,
wherein each sector has a plurality of neighbor sectors, and
wherein the current serving sector transmits the sector load information for all neighbor sectors to the wireless communicator.

64. A computer-readable storage medium comprising instructions, which, when executed by a wireless communicator being served by a current serving sector, cause the wireless communicator to perform operations, the instructions comprising:
program code to receive sector load information for each sector in the wireless communicator's Active Set (AS);
program code to measure the carrier-to-interference (C/I) ratio for each sector in the wireless communicator's Active Set (AS);
program code to store the carrier-to-interference (C/I) ratio measurements for the sectors in the wireless communicator's Active Set (AS); and
program code to determine a new serving sector based on the carrier-to-interference (C/I) ratio measurements and sector load information for each of the AS sectors,
wherein each sector has a plurality of neighbor sectors, and
wherein the current serving sector transmits the sector load information for all neighbor sectors to the wireless communicator.

65. A system, comprising:
a plurality of remote stations each comprising a plurality of sectors, wherein each remote station comprises:
a processor which determines sector load information; and
a transmitter which transmits the sector load information; and a wireless communicator, served by a current serving sector, comprising:
a channel quality estimator which measures the carrier-to-interference (C/I) ratio for each sector in the wireless communicator's Active Set (AS);
a memory which stores the carrier-to-interference (C/I) ratio measurements for the sectors in the wireless communicator's Active Set (AS); and
a processor which determines a new serving sector based on the carrier-to-interference (C/I) ratio measurements and the sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

66. A system according to claim 65, wherein the wireless communicator, upon determining the new serving sector, modifies the measured the carrier-to-interference (C/I) ratio value to be used in the new serving sector selection, based on the corresponding value of PN_LOAD.

67. A system according to claim 65, wherein the wireless communicator, upon determining the new serving sector, adds the corresponding value of PN_LOAD to the measured the carrier-to-interference (C/I) ratio value.

68. A wireless communicator, served by a current serving sector, comprising:
a receiver which receives sector load information for each sector in the wireless communicator's Active Set (AS);
a channel quality estimator which measures the carrier-to-interference (C/I) ratio for each sector in the wireless communicator's Active Set (AS);
a memory which stores the carrier-to-interference (C/I) ratio measurements for the sectors in the wireless communicator's Active Set (AS); and
a processor which determines a new serving sector based on the carrier-to-interference (C/I) ratio measurements and sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

69. A wireless communicator according to claim 68, wherein the processor, upon determining the new serving sector, modifies the measured the carrier-to-interference (C/I) ratio value to be used i the new serving sector selection, based on the corresponding value of PN_LOAD.

70. A wireless communicator according to claim 68, wherein the processor, upon determining the new serving sector, adds the corresponding value of PN_LOAD to the measured the carrier-to-interference (C/I) ratio value.

71. A method, comprising:
determining sector load information for a plurality of sectors comprising a current serving sector;
transmitting, by a transmitter, the sector load information to a wireless communicator; and
measuring the carrier-to-interference (C/I) ratio for each sector in an Active Set (AS);
storing the carrier-to-interference (C/I) ratio measurements for the sectors in the Active Set (AS); and
determining a new serving sector based on the carrier-to-interference (C/I) ratio measurements and the sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

72. A method according to claim 71, further comprising:
upon determining the new serving sector, modifying the measured the carrier-to-interference (C/I) ratio value to be used in the new serving sector selection, based on the corresponding value of PN_LOAD.

73. A method according to claim 71, further comprising:
upon determining the new serving Sector, adding the corresponding value of PN_LOAD to the measured the carrier-to-interference (C/I) ratio value.

74. A method for use with a wireless communicator being served by a current serving sector, comprising:
receiving sector load information for each sector in the wireless communicator's Active Set (AS);
measuring the carrier-to-interference (C/I) ratio for each sector in the wireless communicator's Active Set (AS);
storing the carrier-to-interference (C/I) ratio measurements for the sectors in the wireless communicator's Active Set (AS); and
determining a new serving sector based on the carrier-to-interference (C/I) ratio measurements and sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

75. A wireless communicator being served by a current serving sector, comprising:
means for receiving sector load information for each sector in the wireless communicator's Active Set (AS);
means for measuring the carrier-to-interference (C/I) ratio for each sector in the wireless communicator's Active Set (AS);
means for storing the carrier-to-interference (C/I) ratio measurements for the sectors in the wireless communicator's Active Set (AS); and
means for determining a new serving sector based on the carrier-to-interference (C/I) ratio measurements and sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

76. A computer-readable storage medium comprising instructions, which, when executed by a wireless communicator being served by a current serving sector, cause the wireless communicator to perform operations, the instructions comprising:
program code to receive sector load information for each sector in the wireless communicator's Active Set (AS);
program code to measure the carrier-to-interference (C/I) ratio for each sector in the wireless communicator's Active Set (AS);
program code to store the carrier-to-interference (C/I) ratio measurements for the sectors in the wireless communicator's Active Set (AS); and
program code to determine a new serving sector based on the carrier-to-interference (C/I) ratio measurements and sector load information for each of the AS sectors,
wherein the sector load information comprises a load information broadcast message comprising PN_OFFSET field which includes PN_OFFSET values and an PN_LOAD field which includes corresponding load value information, and wherein the wireless communicator stores the PN_LOAD value if the value of PN_OFFSET matches any of the AS sector pilots.

* * * * *